United States Patent [19]
Cudaback

[11] Patent Number: 4,708,171
[45] Date of Patent: Nov. 24, 1987

[54] DRAIN VALVE

[75] Inventor: Roger L. Cudaback, Gibbon, Nebr.

[73] Assignee: J. A. Baldwin Manufacturing Co., Kearney, Nebr.

[21] Appl. No.: 930,430

[22] Filed: Nov. 14, 1986

[51] Int. Cl.[4] ............................................. F16K 24/00
[52] U.S. Cl. .................................. 137/588; 251/215; 251/218
[58] Field of Search ............... 137/588; 251/118, 214, 251/215, 351, 218; 222/481.5, 484, 521; 210/248

[56] References Cited

U.S. PATENT DOCUMENTS

| | | | |
|---|---|---|---|
| 2,046,474 | 7/1936 | Maggenti | 137/588 |
| 2,810,398 | 10/1957 | Carlson | 137/588 |
| 3,698,431 | 10/1972 | Thompson | 251/118 X |
| 3,820,564 | 6/1974 | Wagner | 251/215 X |
| 4,417,601 | 11/1983 | Bennett | 251/215 X |
| 4,440,193 | 4/1984 | Matheson | 137/558 |
| 4,611,627 | 9/1986 | Eidsvoog et al. | 137/588 |
| 4,619,764 | 10/1986 | Church et al. | 210/248 |

Primary Examiner—Alan Cohan
Assistant Examiner—John Rivell
Attorney, Agent, or Firm—Leydig, Voit & Mayer

[57] ABSTRACT

The valve includes a valve member adapted to be moved axially between open and closed positions in a valve housing when the valve member is rotated. The valve member includes a passage for admitting air into a vacuumized vessel and includes a separate passage for draining liquid from the vessel when the valve member is in its open position. An O-ring establishes a primary seal between the valve member and the valve housing and is retained within the housing in all positions of the valve member.

11 Claims, 7 Drawing Figures

DRAIN VALVE

BACKGROUND OF THE INVENTION

This invention relates to a drain valve and, more particularly, to a drain valve which is especially useful for draining liquid from a closed vessel whose interior is under a vacuum at the time the valve is first opened. One such vessel forms part of a fuel/water separator or filter for an internal combustion engine. As fuel flows through the filter element, water is separated therefrom and collects at the bottom of the vessel. Periodically, water and other contaminants must be drained from the vessel. Rapid and complete draining can be effected only if ambient air is admitted into the vessel to break the vacuum therein.

Drain valves which are particularly adapted for use with fuel/water separators are disclosed in Wilson U.S. Pat. No. 4,314,689 and Matheson U.S. Pat. No. 4,440,193. In those valves, the main sealing ring between the valve member and its housing moves with the valve member and out of the housing when the valve member is opened and thus the sealing ring is exposed to external contamination such as grease and dirt.

SUMMARY OF THE INVENTION

The general aim of the present invention is to provide a new and improved drain valve which is of simplified construction, which effects efficient breaking of the vacuum and draining of the liquid and which maintains the main sealing ring in a protected environment at all times so as to avoid contamination and excessive wear of the sealing ring.

A more detailed object of the invention is to provide a drain valve in which the valve member is moved axially between open and closed positions as an incident to being rotated and in which the main sealing ring remains within the valve housing at all times during opening and closing of the valve member.

Still another object is to provide a valve member and valve housing formed with uniquely arranged ports, passages and sealing surfaces which allow effective draining of the vessel when the valve member is open while sealing the vessel tightly when the valve member is closed.

The invention also resides in the relatively inexpensive construction and trouble-free operation of the valve.

These and other objects and advantages of the invention will become more apparent from the following detailed description when taken in conjunction with the accompanying drawings.

DETAILED DESCRIPTION OF THE PREFERRED EMBODIMENT

Figure 1:
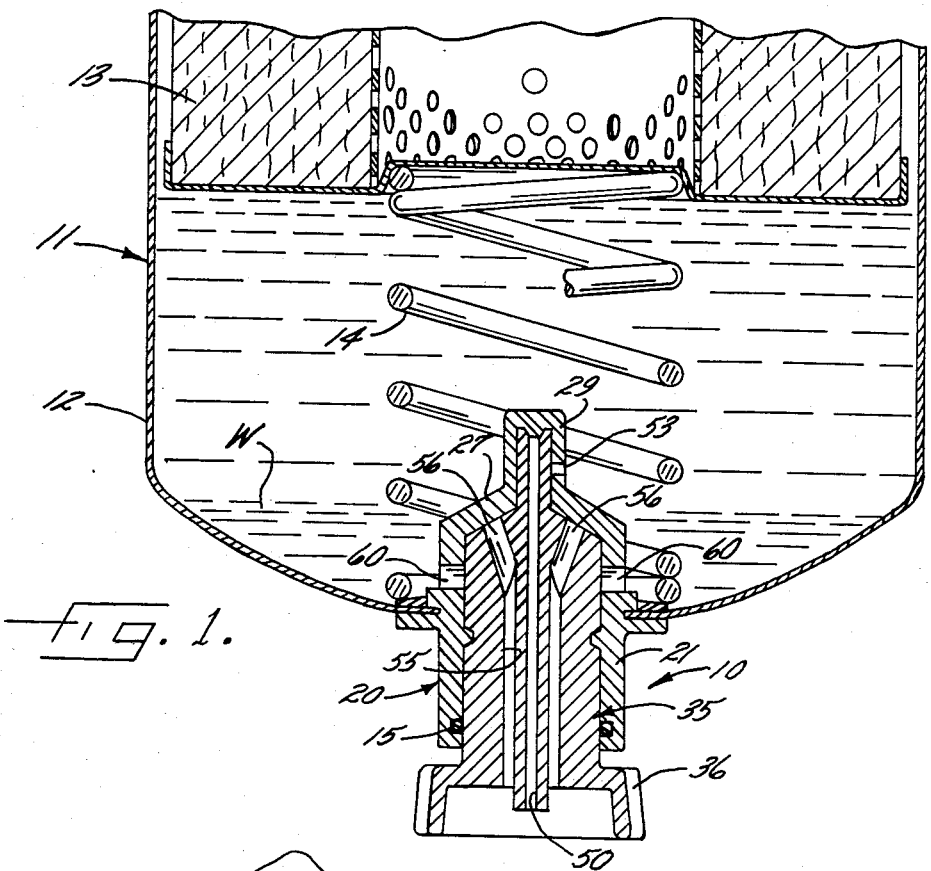
FIG. 1 is a fragmentary cross-sectional view taken axially through a typical fuel/water separator equipped with a new and improved drain valve incorporating the unique features of the present invention.

For purposes of illustration, the drain valve 10 of the invention has been shown in the drawings in conjunction with a fuel/water separator 11 of the type used with an internal combustion engine such as a diesel engine. The separator includes a closed sheet metal vessel 12 which houses a filter 13 that is held and located in the vessel by a coil spring 14. During typical operation, fuel flows through the filter while water W and heavier molecular particles are separated therefrom and accummulate in the lower portion of the vessel.

The vessel 12 must be drained periodically in order to remove the water and other contaminants. When the engine is shut down, a vacuum exists in the vessel and, in order to drain the vessel, it is necessary to break the vacuum by admitting air into the vessel.

The present invention contemplates a new and improved drain valve 10 which, when first opened, simultaneously admits air into the vessel 12 and allows water to drain from the vessel. The valve is characterized particularly by its relatively simple construction and by the provision of a main sealing ring 15 which is fully protected from outside contamination when the valve is in an open condition.

More specifically, the valve 10 includes a housing 20 molded of suitable plastic and having a generally cylindrical section 21 (FIG. 2) which defines a cylindrical bore 22. The upper half of the housing is located within the lower portion of the vessel 12 while the lower half of the housing extends through a hole 23 in the bottom of the vessel and is located outside of the vessel. Radial flanges 24 and 25 are located about midway between the ends of the valve housing and define an annular groove which receives the annulus of sheet metal which defines the edge of the hole 23 of the vessel. After the valve housing 20 has been inserted into the hole, a washer 26 may be bonded to the upper flange 24 to help prevent the housing from being pulled downwardly out of the hole.

The valve housing 20 also includes an upwardly tapered section 27 (FIG. 2) located at the upper end of the cylindrical section 21 and formed with a concave and generally frustoconical inner surface 28 which defines a valve seat. Formed integrally with the upper end of the tapered section 27 is another generally cylindrical section 29 formed with a closed end and defining a socket 30. For a purpose to be described subsequently, a downwardly tapered plug 31 projects downwardly from the closed end of the socket 30.

Figure 2:
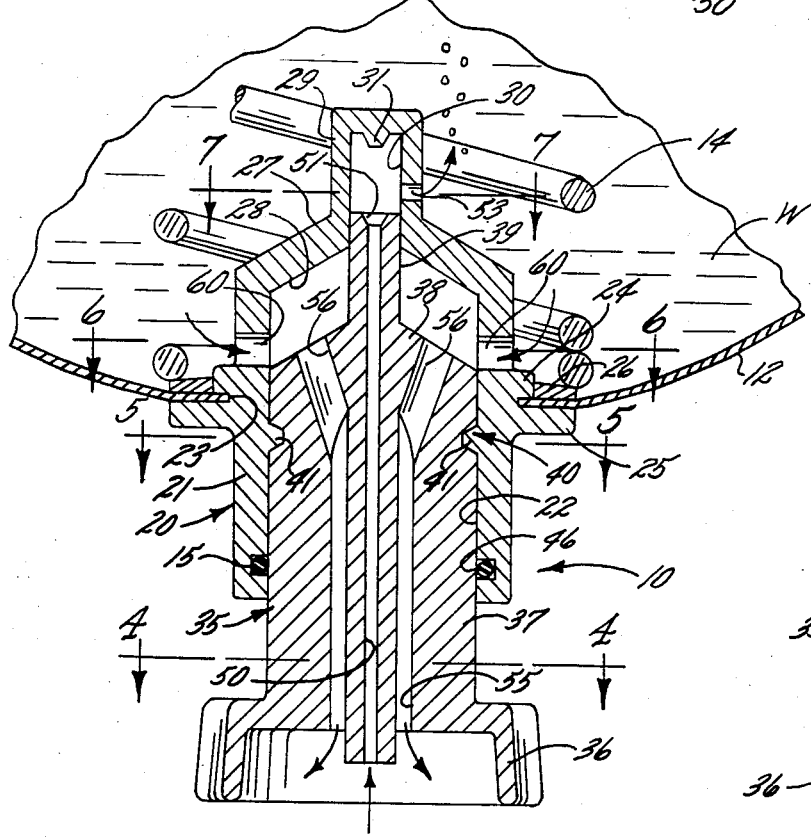
FIG. 2 is an enlarged fragmentary view similar to FIG. 1 but shows the valve member of the valve in an open position.

Rotatably supported within the bore 22 of the valve housing 20 is a plastic valve member 35 which is adapted to be moved axially between a closed position (FIG. 1) and an open position (FIG. 2). The extreme lower end of the valve member is formed with an enlarged knob 36 which facilitates turning of the valve member. Immediately above the knob, the valve member is formed with a cylindrical body 37 whose upper end terminates in an upwardly facing convex frustoconical surface 38 which is formed on the same cone angle as the concave frustoconical surface 28 of the valve housing 20. The valve member 35 is completed by a reduced diameter stem 39 which projects upwardly from the upper end of the body 37 and into the socket 30 of the housing 20.

Figure 3:
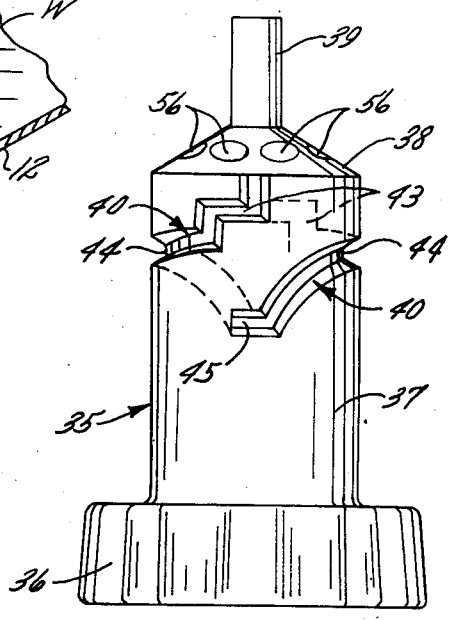
FIG. 3 is an elevational view of the valve member.
Figure 4:
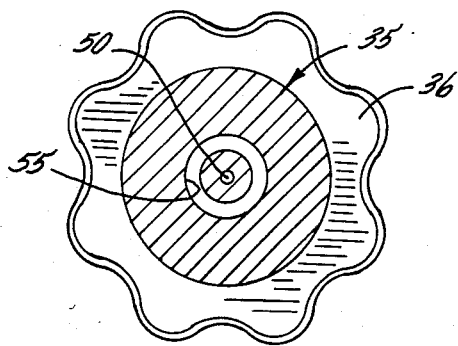
FIGS. 4, 5, 6 and 7 are cross-sectional views taken along the lines 4—4, 5—5, 6—6 and 7—7, respectively, of FIG. 2.
Figure 5:
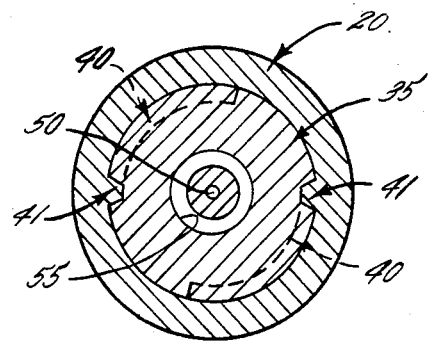
Figure 6:
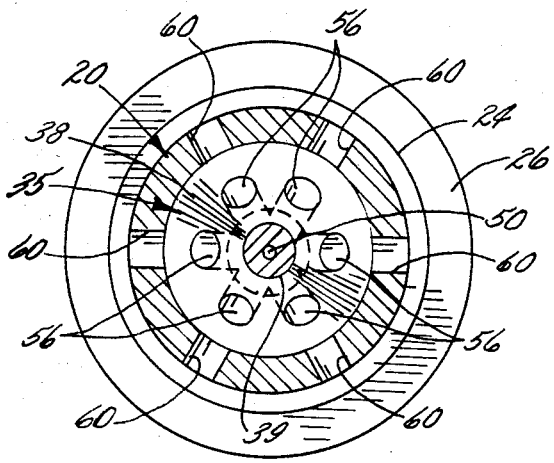
Figure 7:
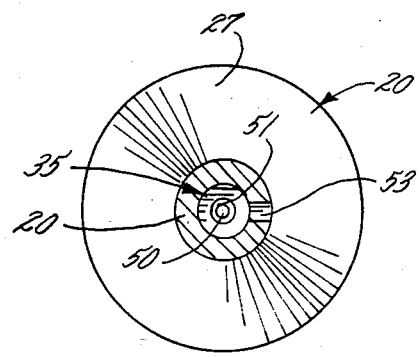

In order to effect axial movement of the valve member 35 between its closed and open positions in response to turning of the valve member, two identical grooves 40 (FIG. 3) are formed in the outer surface of the body 37 of the valve member and are spaced 180 degrees from one another around the body. The grooves receive diametrically spaced conical pins 41 (FIG. 2) formed integrally with the cylindrical section 21 of the valve housing 20 and projecting radially into the bore 22 thereof. Each groove 40 includes a generally S-shaped entry section 43 (FIG. 3), a helical section 44 which extends approximately 180 degrees around the body 37 and a terminal section 45 located in a plane perpendicular to the axis of the valve member 35. When the valve member is rotated, the helical sections 44 of the grooves 40 ride along the pins 41 and act as a thread to cause the valve member to move axially upwardly or downwardly depending upon the direction of rotation.

The sealing ring 15 for establishing a seal between the valve housing 20 and the valve member 35 preferably is an O-ring telescoped over the body 37 of the valve member and received in an annular groove 46 which is formed in the extreme lower end portion of the cylindrical section 21 of the housing. The O-ring 15 remains seated in the groove 46 and remains axially stationary when the valve member 35 is rotated and is moved axially between its closed and open positions. Thus, the O-ring is always protected from outside contamination by the housing 20 and is not subjected to wear which otherwise would result from axial movement of the O-ring.

To admit air into the vessel 12 when the valve member 35 is open, an axially extending air passage 50 (FIG. 2) is formed through the center of the body 37 and stem 39 of the valve member. The upper end of the passage 50 terminates in a frustoconical seat 51 which receives and seals against the plug 31 when the valve member is in its closed position. When the valve member is opened, the passage 50 is pulled away from the plug 31 and, after the valve member has moved downwardly through a predetermined distance, the stem 39 uncovers a hole 53 formed radially through the reduced diameter housing section 29 and establishing communication between the vessel 12 and the socket 30. As a result, air may flow upwardly through the air passage 50 and into the vessel 12 via the hole 53 so as to break the vacuum in the vessel. When the valve member is closed, the hole 53 is closed off by the stem 39 and, in addition, the air passage 50 is sealed by the plug 31.

Water is permitted to drain from the vessel 12 at substantially the same time that air is first admitted into the vessel. For this purpose, the body 37 of the valve member 35 is formed with an annular water passage 55 which is concentric with and isolated from the air passage 50. The upper end of the annular water passage 55 communicates with six angularly spaced ports 56 which open upwardly out of the convex frustoconical surface 38 of the valve member. When the valve member is in its closed position, the ports 56 are sealed off by virtue of the convex frustoconical surface 38 mating with and seating against the concave frustoconical surface 28 of the valve housing 20. As the valve member is opened, the ports 56 move downwardly away from the concave surface 28 and, shortly thereafter, the cylindrical body 37 of the valve member 35 uncovers a series (e.g., six) of radially extending openings 60 formed through the cylindrical section 21 of the valve housing 20 and establishing communication between the vessel 12 and the bore 22. As a result, water is permitted to drain from the vessel by way of the openings 60, the ports 56 and the passage 55. The openings 60 are covered and closed off by the body 37 of the valve member 35 when the latter is in its closed position.

To summarize, when the valve member 35 is in its closed position, the hole 53 and the openings 60 in the valve housing 20 are closed off by the valve member 35, the separate air and water passages 50 and 55 in the valve member are closed off by the valve housing, and a primary seal is established between the valve housing and the valve member by the O-ring 15. When the valve member is manually rotated, it is shifted downwardly by the coaction of the grooves 40 and the pins 41 and, as an incident thereto, the upper ends of the passages 50 and 55 are opened. With continued downward movement of the valve member, the hole 53 and the openings 60 are simultaneously uncovered to begin admitting air into the vessel 12 through the air passage 50 and the hole 53 and, at the same time, to permit water to begin draining from the vessel at a relatively high flow rate through the openings 60, the ports 56 and the annular water passage 55. The O-ring 15 remains within the valve housing 20 and thus is not subjected to contamination and severe wear.

While the drain valve 10 of the invention has been disclosed specifically in conjunction with a fuel/water separator 11, those familiar with the art will appreciate that the valve may be used to drain liquid from many other types of vessels in which it is necessary to vent the vessel to atmosphere to promote rapid draining.

What is claimed:

1. A selectively operable valve for enabling liquid to be drained from a sealed vessel, said valve comprising a stationary housing adapted to be secured to said vessel, a valve member rotatably supported within said housing, means coacting between said housing and said valve member and causing said valve member to move axially from a closed position to an open position when said valve member is rotated in one direction, an air passage extending generally axially through said valve member and having one end open to ambient atmosphere at all times in both positions of said valve member, a liquid passage extending generally axially through said valve member and isolated from said air passage, means within said housing for sealing said air and liquid passages with respect to said vessel when said valve member is in said closed position, means in said housing for establishing communication between said vessel and said air passage and between said vessel and said liquid passage when said valve member is in said open position whereby air is permitted to enter said vessel and liquid is permitted to drain from said vessel, and a sealing ring telescoped into said housing and over said valve member and remaining in said housing at all times when said valve member is moved between said closed and open positions.

2. A valve as defined in claim 1 in which said air passage extends axially along the center portion of said valve member, said liquid passage being an annular passage concentric with said air passage, and ports in one end portion of said valve member and communicating with said liquid passage.

3. A valve as defined in claim 1 in which said valve member comprises a generally cylindrical body having a convex and generally frustoconical surface at one end portion and further comprises an elongated reduced diameter stem projecting axially from said one end portion, said housing having a generally cylindrical bore which receives said body, having a concave and generally frustoconical surface defining one end portion of said bore and adapted to mate with the frustoconical surface of said body in the closed position of said valve member, and having a reduced diameter socket located adjacent said one end portion of said bore and receiving said stem, the closed end of said socket and said concave frustoconical surface of said bore constituting said means for sealing said air and liquid passages when said valve member is in said closed position.

4. A valve as defined in claim 3 in which said air passage extends axially through the center portion of said stem, and a plug at the closed end of said socket and adapted to project into and seal said air passage when said valve member is in said closed position.

5. A valve as defined in claim 4 in which said liquid passage is an annular passage concentric with said air passage, and angularly spaced ports in the convex frustoconical surface of said valve member and communicating with said liquid passage.

6. A valve as defined in claim 4 in which said means for establishing communication between said air passage and said vessel comprise a radially extending hole formed through said socket and spaced axially from said plug, said hole being covered by said stem when said valve member is in said closed position and communicating with the interior of said socket when said valve member is in said open position.

7. A valve as defined in claim 6 in which said means for establishing communication between said liquid passage and said vessel comprise radially extending and angularly spaced openings formed through said housing, said openings being covered by the body of said valve member when said valve member is in said closed position and communicating with said bore when said valve member is in said open position.

8. A valve as defined in claim 7 in which said hole and said openings are located so as to commence communication with said socket and said bore, respectively, at about the same time as said valve member is moved from said closed position toward said open position.

9. A valve as defined in claim 1 in which said means for causing said valve member to move from said closed position to said open position comprise a helical groove formed in said valve member, and a radially extending pin rigid with the inner side of said housing and projecting into said groove.

10. A selectively operable valve for enabling liquid to be drained from the bottom of a vessel, said valve comprising an upright housing adapted to be secured to the bottom of the vessel, said housing having a substantially upright bore, having a downwardly facing and concave frustoconical surface at the upper end portion of said bore and having a reduced diameter socket above said concave surface, a valve member rotatably supported within said housing, means coacting between said housing and said valve member and causing said valve member to move axially downwardly from a closed position to an open position when said valve member is rotated in one direction, said valve member comprising a generally cylindrical upright body rotatably supported in said bore and having an upwardly facing and convex frustoconical surface at its upper end portion, said valve member further comprising a reduced diameter stem projecting axially from the upper end of said body and extending into said socket when said valve member is in said closed position, an air passage extending axially through the center portion of said body and said stem, an annular liquid passage isolated from and concentric with said air passage and opening downwardly out of the lower end of said body, a series of angularly spaced ports formed in said convex surface of said body and communicating with said liquid passage, said convex surface seating against said concave surface to close off said ports when said valve member is in said closed position and being spaced below said concave surface when said valve member is in said open position, said stem seating against the closed end of said socket to close off the upper end of said air passage when said valve member is in said closed position and being spaced below the closed end of said socket when said valve member is in said open position, a hole extending radially through said socket, said stem covering said hole when said valve member is in said closed position and being located below said hole when said valve member is in said open position whereby air may be admitted into said vessel by way of said air passage and said hole, an opening extending radially through said housing, said convex surface being located above said opening when said valve member is in said closed position and being located below said opening when said valve member is in said open position whereby liquid may be drained from said vessel by way of said hole, said ports and said liquid passage, and a sealing ring telescoped into the bore of said housing and over the body of said valve member and remaining axially stationary when said valve member is moved between said closed and open positions.

11. A valve as defined in claim 10 further including a plug projecting downwardly from the closed end of said socket and sized to project into and seal the upper end of said air passage when said valve member is in said closed position.

* * * * *